United States Patent [19]
Upton

[11] 3,982,917
[45] Sept. 28, 1976

[54] METHOD OF INCREASING THE STRENGTH OF SILICATE GLASS LASER RODS

[75] Inventor: Lee O. Upton, Sturbridge, Mass.

[73] Assignee: The United States of America as represented by the Secretary of the Army, Washington, D.C.

[22] Filed: Feb. 4, 1975

[21] Appl. No.: 546,971

[52] U.S. Cl. .......... 65/31; 65/61
[51] Int. Cl.[2] .......... C03C 15/00; C03C 19/00
[58] Field of Search .......... 65/31, 37, 38, 61

[56] References Cited

UNITED STATES PATENTS

| | | | |
|---|---|---|---|
| 3,023,139 | 2/1962 | Van Tetterupe | 65/31 X |
| 3,171,768 | 3/1963 | Levengood | 65/31 X |
| 3,301,649 | 11/1967 | Marusak | 65/31 X |
| 3,647,583 | 3/1972 | De Rouw | 65/31 X |
| 3,687,799 | 8/1972 | Spanoudis | 65/31 X |
| 3,779,732 | 12/1973 | Spanoudis | 65/31 |
| 3,843,472 | 10/1974 | Toussaint et al. | 65/31 X |

*Primary Examiner*—S. Leon Bashore
*Assistant Examiner*—Frank W. Miga
*Attorney, Agent, or Firm*—Nathan Edelberg; Robert P. Gibson; Jack W. Voigt

[57] ABSTRACT

Glass laser rods are treated and strengthened by a method which produces a hardened surface that protects the laser rods from physical abrasion, prevents failure due to thermal shock, and removes flaws while not interfering with light pumping through the sides of the treated rods. The method includes subjecting the prepared glass laser rods to an acid polishing procedure which employs an acid polishing solution comprised of equal parts of concentrated hydrofluoric and concentrated nitric acid.

2 Claims, No Drawings

METHOD OF INCREASING THE STRENGTH OF SILICATE GLASS LASER RODS

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

The present invention relates to the strengthening of silicate glass laser rods by a method of treating which provides a surface that is stable against thermal shock and that does not interfere with light pumping through the sides of the treated rods.

In the manufacturing of glass laser rods, certain imperfections result which must be removed or corrected by special procedures; otherwise, the laser rods yield less than the desired results. For example, the glass laser rods are generally cut with a diamond tool. The cutting and finishing procedure generally leaves incipient fractures from a number of causes; i.e., diamond tool cutting marks, imbedded surface inclusions, shatter marks, spontaneous fractures or incipient cracks resulting from uneven strain distribution. The surfaces are generally ground and polished with a fine abrasive material to remove the larger cutting marks and imperfections. The diamond tool cutting marks are generally ground away with a 180 grit abrasive material (e.g. corundum, emery, or the like). The quality control procedure used to evaluate a finished glass laser rod includes heating the rod to a temperature of about 250° to 300°F in an oil such as a silicone oil (e.g., DC 200) and then plunging in water at about 80°F. If a laser rod withstands this gradient test, then it is generally considered acceptable for extended use. However, a high percentage of the failures of prior art rods were due to cracking, and if the strain distribution which caused cracking were quite uneven, the rods would fall completely apart under conditions of thermal shock exposure.

Glass laser rods in the past have been subject often to damage by physical abrasion and thermal shock since they had not been prior conditioned to withstand these forces. The usefulness of laser rods depends on their ability to withstand thermal shock and on how well light can be transmitted at particular wave lengths. Flaws can effect the efficiency and usefulness of laser rods. Flaws which have been commonly referred to as Griffith's flaws have rendered the glass laser rods inefficient. Attempts to seal these flaws and still not interfere with light pumping through the sides of the treated laser rods has been a problem which the laser art has been challenged to solve.

Therefore, an object of this invention is to provide a method of increasing the strength of glass laser rods to withstand thermal shock.

Another object of this invention is to provide a method of treating and strengthening glass laser rods which seals flaws and enables light pumping to be accomplished through the sides of the treated and strengthened glass laser rods.

SUMMARY OF THE INVENTION

Glass laser rods having fire-polished cylindrical walls and ground and polished ends are prepared by removing surface cutting or sawing marks and imbedded surface inclusions followed by washing with soap and water and rinsing with water. The rods are then immersed for one minute in an acid bath comprised of 50% concentrated hydrofluoric acid (about 48 percent HF) and 50 percent concentrated nitric acid (about 70 percent $HNO_3$). Reaction products comprised of a surface precipitate of hydrated fluosilicates are washed off the laser rods. The immersion and the rinsing procedure is repeated a plurality of times, preferably four times, to achieve a complete removal of the flaws. When so treated and subjected to a gradient test (heated in silicone oil at 275°F and plunged in water at 80°F) the laser rods will withstand this test on a very high percentage basis. Examination of the failures indicated, in most cases, that failure resulted from improper removal of saw-marks left from the cutting procedure. This condition resulted in a surface condition that was not remedied by the acid polishing step. A properly prepared glass laser rod that is subsequently subjected to a plurality of acid polishing and rinsing cycles is essential for yielding a preferred glass laser rod having improved strength and thermal stability.

DESCRIPTION OF THE PREFERRED EMBODIMENT

The method of this invention is particularly useful in strengthening silicate glass laser rods. The type laser glass used in the following method is referred to as 3835 laser glass. The 3835 glass is a silicate glass which can be made stable against thermal shock or physical abrasion by the hardening process described below. The higher the content of silica, the more susceptible the glass is to the hardening process described.

Prior to the discovery of the hardening process which yields the preferred results, a coating procedure was conceived whereby the glass laser rods were coated with ruby-colored gold-containing resinates which were fired to 900°F to form the coating. The coated rods were subjected to a gradient test (thermal shock from 300°F to 80°F). Cracking occurred almost identically throughout the piece as occurred in the uncoated rods. A single coating was considered to be insufficient to heal surface cracks and protect the glass substrate. A double coating of goldresinate was applied (fired after each coating to 900°F). When subjected to thermal shock from 300°F to 80°F large cracks developed but not as severe as for single-coated sample. The coating offered some protection against physical abrasion and abuse, sealed the "Griffith's" flaws, and transmitted light very well in the red region but the coating transmitted light poorly in the blue region. The gold resinate known as 7840 Ruby luster was employed in this procedure. Although the double coating procedure did not achieve the degree of surface flaw healing and protection to the glass substrate as required for greater durability, the coating procedure did provide insight to the ultimate solution to a major problem by leading to the discovery of the preferred method for increasing the strength of glass laser rods as set forth below.

Glass laser rods which are to be strengthened are prepared for the treatment by first removing the larger imperfections such as saw marks and embedded surface inclusions. An abrasive with a grit size of about 180 mesh is preferred for this abrasive grinding and polishing procedure. After the grinding and polishing procedure, the laser rods are washed with soap and water and then rinsed with water. The prepared glass laser rods are then immersed for a period of about one minute in an acid polishing solution comprised of 50 percent concentrated hydrofluoric acid (48% HF) and 50 percent concentrated nitric acid (70 percent $HNO_3$). The immersed rods are provided with some agitation by sloshing up and down. The rods are removed, and reaction products, believed to be comprised of a surface precipitate of hydrated fluosilicates, are washed off in a beaker of tap water. The rod is then subjected to a gradient test by immediately immersing in silicone oil (DC 200) at 275°F for 10 minutes. After removal from the hot oil the rod is plunged into water at 80°F. Several samples survived this drastic test, but several rods did not survive. Closer examination of the failures indicated some failures due to incomplete removal of larger surface marks before acid polishing.

Additional tests were run on laser rods 1 inch × 5½ inches by prior preparation as described and then immersing in the acid polishing solution a plurality of times for a one minute duration followed by a rinsing away of the fluosilicate precipitate with water between immersions. After immersing for four one minute periods with rinsing between each period, and after the last rinse, the laser rods are heated to 250°F in DC 200 silicone oil for 20 minutes to ensure thorough heating. The rods are then individually plunged into 80°F tap water, and in every case the rods withstood the thermal shock. The results are outstanding since a very high percentage of control rods failed when subjected to even a lower temperature gradient test as shown below in Table I, Test Data. Thus, a plurality of immersing and rinsing cycles are necessary to impart the proper "healing" to surface defects which ultimately could lead to failure of the rod from thermal shock or physical forces.

The test data shown in Table I is for 50 rods which were cut and rough ground and subjected to thermal shock treatment. Twenty five laser rods, each of ¾ inch diameter × 4 inches long and 1 inch diameter × 5½ inches long, number 3835 glass, were heated to various temperatures in DC200 silicone oil and plunged into 80°F water. The following table shows the pertinent data:

TABLE I

TEST DATA

| DC200 BATH °F | DC200 BATH °C | ΔT °F | $H_2O$ BATH °F | TOTAL RODS TESTED | TOTAL RODS WITH BREAKAGE | |
|---|---|---|---|---|---|---|
| 140 | 60 | 60 | 80 | 25 | 0 | RODS ¾" DIAMETER × 4" LONG |
| 158 | 70 | 78 | 80 | 25 | 4 | |
| 176 | 80 | 96 | 80 | 21 | 9 | |
| 194 | 90 | 114 | 80 | 12 | 10 | |
| 212 | 100 | 132 | 80 | 2 | 2 | |
| 140 | 60 | 60 | 80 | 25 | 1 | RODS 1" DIAMETER × 5½" LONG |
| 158 | 70 | 78 | 80 | 24 | 6 | |
| 176 | 80 | 96 | 80 | 18 | 12 | |
| 194 | 90 | 114 | 80 | 6 | 6 | |

From the testing of control and sample rods the following observations are noted. Failure occurred in the control rods in a very high percentage as the shock temperature differential approached 100°F. Substantially all the control rods failed at about 114°F differential whereas substantially all the laser rods treated in accordance with the method of this invention withstood the shock tests even as high as a 170°F differential. The failures then occurred only for the sample rods if the acid polishing step were insufficient, ends were poorly prepared (failure to remove incipient cracks) or length to diameter ratio of the rods was under about 5.3. For example, if the ratio of length to diameter were under 4, samples fractured every time during the plunge test. In other words, the rods are actually weaker if too short for their diameters. Rods ¾ inch in diameter and 4 inches long when compared with rods 1 inch in diameter and 5½ inches long gave comparable data in the plunge tests--the length to diameter in each case being in the preferred range.

The silicone oil is used as a vehicle to administer the various shock tests described, and it is readily available from a number of suppliers. The silicone oil was used in the gradient shock tests for the control laser rods as well as the treated rods; therefore, the test data shows that the treating and strengthening method of this invention yields reproducible glass laser rods having a low failure rate due to thermal shock.

I claim:

1. A method of increasing the strength of silicate glass laser rod that has been manufactured from a silicate host glass doped with a laser active material, cut to a rod shape, and subsequently ground and polished with an abrasive material to remove the larger cutting marks and imperfections, said method which produces a hardened surface that protects the silicate glass laser rod from physical abrasions, prevents failure due to thermal shock, and removes flaws while not interfering with light pumping through the sides of the silicate glass laser rod comprising;

i. providing silicate glass laser rod that has been prepared by cutting said rod to a predetermined dimension having a predetermined length to diameter ratio range about 4.0 to about 5.3.

ii. preparing said silicate glass laser rod for an acid polishing procedure by first subjecting said provided rod to an abrasive grinding and polishing procedure employing an abrasive with grit of about 180 mesh size that removes all incipient fractures that result from or include cutting tool marks, embedded surface inclusions, shatter marks, and uneven strain distribution;

iii. washing said prepared rod with soap and water and rinsing rod with water; and then, iv. completing a predetermined number of immersing and rinsing cycles that includes plunging said washed and rinsed rod into an acid polishing solution and sloshing said rod up and down for a period of time of about one minute, removing said rod from said acid polishing solution and water rinsing said rod of reaction products, said acid polishing solution comprised of 50 percent concentrated hydrofluoric acid containing about 48 percent HF and 50 percent concentrated nitric acid containing about 70 percent $HNO_3$.

2. The method of claim 1 wherein said predetermined immersing and rinsing cycles completed are at least four.

* * * * *